United States Patent Office 3,525,702
Patented Aug. 25, 1970

3,525,702
METHOD OF INCREASING THE ACTIVITY AND STABILITY OF RANEY-TYPE CATALYSTS
Ferdinand von Sturm, Erlangen-Buchenbach, and Annie Thieleking, Erlangen, Germany, assignors to Siemens Aktiengesellschaft, a corporation of Germany
Filed Feb. 2, 1967, Ser. No. 613,467
Claims priority, application Germany, Feb. 5, 1966, S 101,849
Int. Cl. B01j 11/22
U.S. Cl. 252—472      4 Claims

ABSTRACT OF THE DISCLOSURE

Raney-type catalysts, preferably Raney nickel, are heated in a hydrogen atmosphere for at least 1 minute to 150–600° C., preferably 250–350° C., and then cooled in the hydrogen atmosphere to normal room temperature. Pre-polarization of the catalyst prior to heating is recommended. The processed catalysts exhibit increased and prolonged catalytic activity. They are particularly useful in electrodes of electrochemical cells, notably fuel cells.

---

Figure 1:
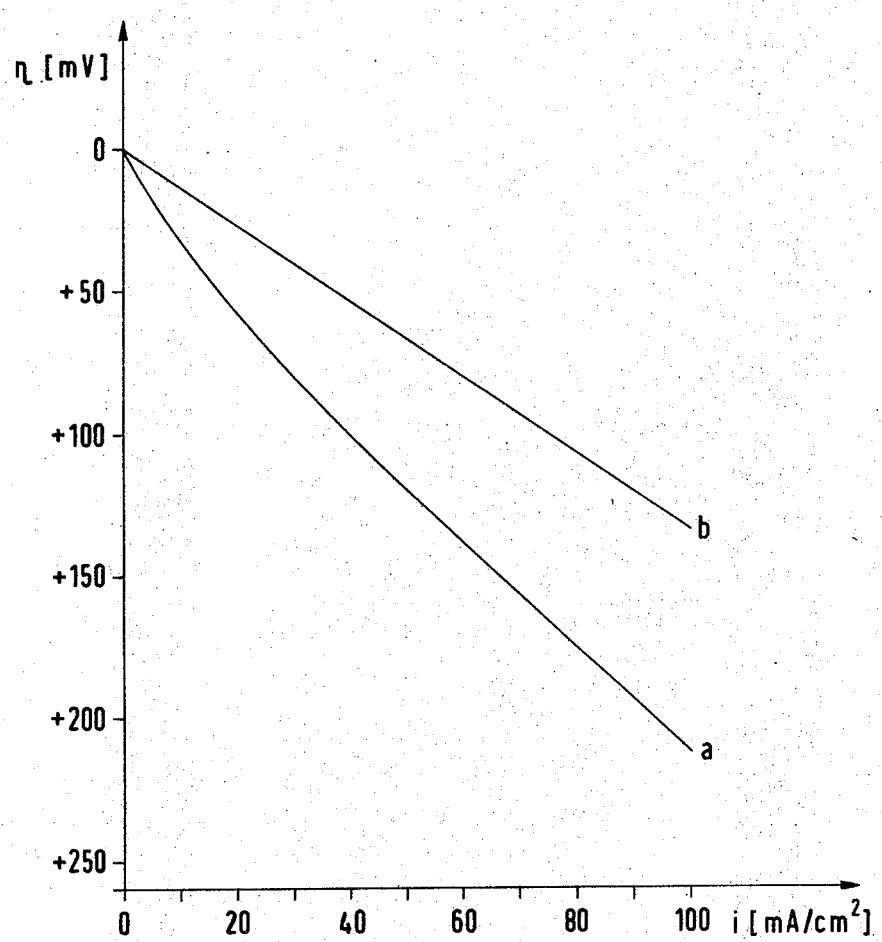

Our invention relates to a method for improving catalysts of the Raney type.

Pure, doped and promoted catalysts of this type, particularly Raney nickel, are known for their hydrogen activating ability. They are formed by melting Ni, Ce, Fe and Cu conjointly with Al, Si, Zn or another catalytically ineffective metal, and thereafter removing the ineffective component by dissolving it with the aid of lyes or acids. Raney-type catalysts are used to a large extent in technological processes, particularly in inorganic hydrolyzing reactions. It is also known that such catalysts, particularly Raney nickel, are eminently capable of activating electrochemical reactions. Built into electrodes, these catalysts greatly reduce the impediments occurring with electrode processes and thus also decrease polarization effects as may reduce the efficiency. Examples of such reactions are:

(1) The cathodic $H_2$ generation,
(2) The anodic $H_2$ oxidation, and
(3) The anodic oxidation of alcohols, aldehydes and salts of the carbonic acids.

When producing hydrogen diffusion electrodes of Raney catalysts, for example Raney nickel, difficulties are encountered mainly due to the fact that the Raney nickel, upon treatment of the starting alloy with aqueous alkali solutions, occurs in the form of fine-granular and pyrophoric powder. If one attempts to shape this powder by pressing and subsequent sintering to the desired electrode shape, the resulting nickel structure reverts to the lesser activity.

According to the German Pat. 1,019,361, hydrogen diffusion electrodes are produced from Raney nickel in an extremely hydrogen-effective constitution, by building the substance into a sintered skeleton structure which determines the shape and mechanical strength of the electrode. This is done by pressing and sintering a powder mixture of about two parts of carbonyl nickel and one part nickel aluminum alloy to the shape of a mechanically stable skeleton, and then dissolving the aluminum content out of the skeleton with the aid of alkaline lye (DSK-electrode). The problems described with reference to using Raney nickel for producing electrodes, can also be solved, at least partially, by pressing the pulverulent highly active catalyst material, immediately upon dissolving the aluminum out of the structure, between two layers, for example with the aid of an electrically good conducting mesh or sieve which presses the catalyst material against a bracing skeleton.

Raney nickel can also be used in electrochemical processes by suspending it in the electrolyte and contacting it only occasionally with an auxiliary electrode. The contacting of the catalyst with the auxiliary electrode is effected at the suspension electrode by stirring (German published patent application DAS 1,162,433) and at the magnet electrode by applying a magnet.

The advantage of using Raney nickel for activation of electrochemical reactions resides in the fact that this catalyst is highly active and catalytically effective at low temperatures so that it can be used below normal room temperature. Also advantageous is the relatively high insensitivity of this catalyst to contamination in the reaction gas.

A disadvantage of Raney-nickel catalysts, however, has been the fact that they could be successfully employed only in the low-temperature range because they progressively lose their activity with increasing temperature.

According to E. Justi and A. Winsel, "Kalte Verbrennung," published by Franz Steiner Verlag GmbH, Wiesbaden (1962), pages 154 to 156. Raney nickel can be heated up to only about 80° C. without essential change or loss of activity, the hydrogen given off being completely readsorbed by the Raney nickel. Heating the catalyst to 100° C. and more causes the adsorptivity to decrease appreciably, and the catalyst simultaneously suffers an irreversible change in structure and converts to a considerably less active constitution.

The unfavorable effect of an activating temperature which is chosen too high when producing double-skeleton catalyst electrodes, is mentioned on pages 117, 118 of the publication just mentioned. The polarization of DSK-electrodes activated at 95° C. with 6 N KOH is said to be considerably greater than the polarization of electrodes activated at 20° C. to 40° C. under otherwise the same conditions.

Notable also is the fact that the activity of Raney nickel produced according to the known methods decays with time.

It is an object of our invention to provide a method of increasing the activity and stability of pure, doped and promoted catalysts of the Raney type.

Another object of the invention is to improve Raney-type catalysts by reducing the decline in activity due to aging.

Still another object of the invention is to facilitate the production of Raney catalysts and to render such production free of hazard, by avoiding the occurrence of pyrophoric production stages.

According to the invention, catalysts of the Raney type, produced by conventional methods, are heated in the presence of hydrogen for at least one minute to temperatures between 150 and 600° C., preferably to temperatures between 250 and 350° C. Prolonging the heating period does not matter since this period is not critical. For reliability we prefer heating the material for about ½ hour. Thereafter, we cool the heated catalyst material in the hydrogen atmosphere down to normal room temperature.

The doping and promoting of the Raney-type catalysts may be effected by means of any metals suitable for these purposes, such as platinum, palladium, chromium, titanium, molybdenum and others (reference may be had to B. M. Bogoslowski and S. S. Kasakowa, "Skelettkatalysatoren in der organischen Chemie," published by VEB Deutscher Verlag der Wissenschaften, Berlin 1960, page 29).

According to the opinion and views universally prevailing in this art, it should have been expected that the method according to the invention will reduce the activity of the Raney-type catalysts, because according to general assumption, the occurrence of the catalytic properties in Raney materials requires an activating process which produces large faults in the lattice arrangement; and it would appear that required arrangement faults will be healed when applying a heat treatment at high temperature.

We have surprisingly discovered, however, that the heating of the Raney-type catalysts according to the invention results in a remarkable increase in activation, which leads to an extra-ordinary increase in the power densities within the electrodes equipped with the catalysts thus treated. Also unexpected has been the further finding that Raney catalysts heated according to the invention and subjected to aging tests throughout prolonged periods of time, remained active much longer than the Raney catalysts obtained only by treatment with aqueous alkaline lyes, and that the catalytic activity of the new catalysts in contact with the reactants becomes very rapidly effective.

The properties of the Raney-type catalysts according to the invention can be further improved by subjecting them to anodic pre-polarization prior or subsequent to the above-described heating process according to the invention. The pre-polarization has mainly the purpose to oxidize out of the Raney-type catalyst any still remaining quantities of the inactive metal, such as aluminum. These are especially oxidized out of the intermetallic types of compounds that are attacked only with difficulty by the alkaline lye. The pre-polarization further entirely or partly oxidizes hydrogen adsorbed or absorbed by the catalyst. In this respect, it should be noted that a reversible exchange of hydrogen is possible only up to a given overvoltage. At high overvoltages there is initiated the oxidation of the active metal and consequently an inactivation of the catalyst. With Raney nickel this limit is at about +200 mv. normal operating voltage, measured relative to the reversible $H_2$-electrode within the same surroundings. The pre-polarization is preferably performed by subjecting the Raney catalyst first to a galvanostatic and subsequently to a potentiostatic load. In principle, however, the load may also be in accordance with only the galvanostatic method or only the potentiostatic method, as is described in "Electrochimica Acta" (1965), vol. 10, pages 1,169 to 1,183.

Preferably the pre-polarization is carried out prior to performing the above-described heating step according to the invention, because this avoids the necessity of additional processing steps such as moistening and drying of the catalysts.

Pre-polarized catalysts of the Raney type, after having been heated in accordance with the invention, will increase their temperature in atmospheric air, but they are no longer pyrophoric and consequently will not spontaneously ignite. The storing and preparation in air thus are very greatly facilitated.

The method according to the invention is best performed by treating the Raney alloy first for one or several days at normal room temperature with 6 N KOH, and subsequently pre-polarizing the alloy anodically. Upon pre-polarization, the catalyst is washed with distilled water, dried in air, and heated to a temperature of about 300° C. for one-half hour in the furnace within an atmosphere of hydrogen of commercial purity. It is essential that the subsequent cooling of the Raney catalyst is effected within a hydrogen atmosphere. Only upon complete cooling is the hydrogen substituted by nitrogen and the specimen quantity removed out of the furnace.

A Raney catalyst processed in accordance with the invention is particularly well suited for activation of electrochemical reactions and consequently for the production of catalyst electrodes in electrochemical cells. The catalyst for this purpose can be used in the so-called powder electrodes in which, if desired, the particles of the catalyst are bonded with the aid of a cementing agent, for example a powder of synthetic plastic such as Plexiglas, Teflon or polyethylene. Similarly, the comminuted catalyst, whether or not it is bonded by means of a synthetic plastic, may also be bonded similarly to a cover layer.

Furthermore, the Raney catalyst processed according to the invention is applicable in electrodes in which it is suspended in the electrolyte and is brought intermittently into contact with the electrodes by stirring or by magnetic forces, or the catalyst may be used in magnet electrodes in which it is continuously in contact with the basic body of the electrode.

The increase in activity achieved by virtue of the invention will illustrated with reference to the example of Raney nickel.

Illustrated in FIG. 1 of the accompanying drawing is a diagram showing a current-voltage curve $a$ measured with Raney nickel produced by processing an aluminum-nickel alloy with 6 N KOH at normal temperature, and a corresponding curve $b$ measured with Raney nickel processed according to the present invention.

Figure 2:
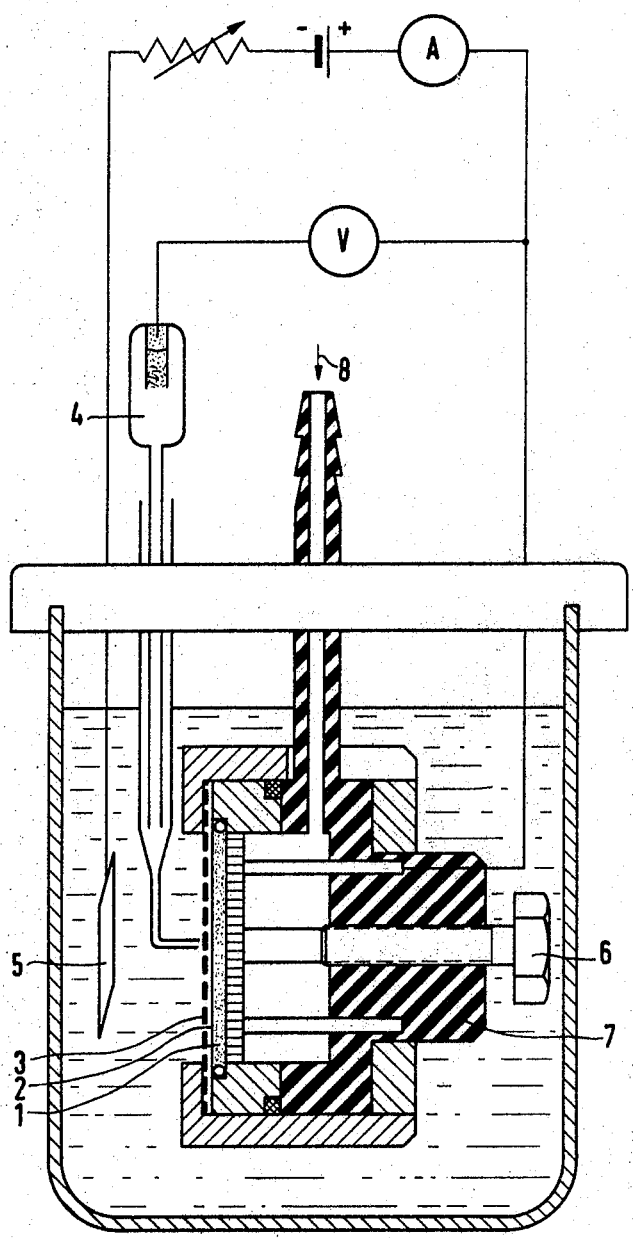

FIG. 2 of the drawing shows schematically and in section an electrochemical cell structure and a measuring circuit as used for ascertaining the curves according to FIG. 1.

EXAMPLE

Used as starting material was an aluminum-nickel alloy with 50% nickel. After comminution, the average grain size of the particles was 25 to 45 μm.

The granular aluminum-nickel alloy was then treated in the known manner for three days at normal room temperature with 6 N KOH and was subsequently polarized anodically. For this purpose, 10 g. of the starting alloy were subjected to a galvanostatic load of 2 amps for half an hour and subsequently to a potentiostatic load at −640 mv., measured against an Hg/HgO electrode. This approximately corresponds to a polarization $\eta$ of +300 mv. for 4 hours. Thereafter the current had declined from approximately 1 amp down to 60 ma. After polarization, the catalyst was washed three times using 50 liter of distilled water each time, then de-watered by suction and dried in air. The drying was accelerated in a furnace at 50° C. The Raney nickel thus pre-dried was heated in a furnace at 300° C. in a hydrogen atmosphere for ½ hour and thereafter cooled during a period of several hours in a flow of hydrogen.

ELECTROCHEMICAL TESTING

The Raney powder thus pre-treated was built into a half-cell according to FIG. 2 and subjected to measuring tests. In FIG. 2, the catalyst is denoted by 1. It is covered by asbestos paper 2 and by a perforated sheet 3 of metal. The reference electrode 4 is constituted by a Hg/HgO electrode. A pressure screw 6 permits compressing the electrolyte powder layer and is in threaded engagement with a holder 7 of synthetic plastic formed of the material available in the trade under the name Plexiglas. Hydrogen is supplied through a line at 8.

Measured relative to the HgO electrode, the continuous voltage of the catalyst pressed within the half-cell in 6 N KOH at 23° C. was initially −460 mv. The departure from the potential of the normal hydrogen electrode was +480 mv. Only after contact with hydrogen of 0.4 superatmospheric pressure was established, did the potential rapidly become negative. After the arrangement was permitted to stand overnight, the thermodynamic potential adjusted itself.

The values mentioned under load at 23° C. are represented by curve $b$ in FIG. 1. Under a load of 30 ma. per $cm.^2$ the electrode exhibits a good voltage constancy at 23° C. under prolonged continuous testing. After a continuous loading of sixty days the polarization had changed only by 2 mv., namely from +40 to +42 mv.

The increase in activity of Raney nickel achieved by virtue of the invention results in an improvement of the current-voltage characteristic. That is, in the current-density range usually occurring in fuel cells, the voltage efficiency is increased by about 5%. At an overvoltage of +80 mv.

the current density and hence the energy density rises nearly to twice the values of a Raney-nickel electrode made in the conventional manner and measured analogously.

We claim:
1. The method of increasing the activity of Raney catalysts, which comprises bringing the Raney catalyst to a potential higher than the reversible hydrogen potential, heating the catalyst in the presence of hydrogen for at least one minute to a temperature between 150 and 600° C., and then cooling the heated catalyst in the hydrogn atmosphere down to normal room temperature.
2. The method according to claim 1, wherein said catalyst is subjected first to a galvanostatic load and then to a potentiostatic load.
3. The method according to claim 2, wherein after the galvanostatic and potentiostatic load, the catalyst is washed with distilled water and then air dried.
4. The method according to claim 1, wherein said Raney-catalyst is Raney nickel.

References Cited

UNITED STATES PATENTS

| | | | |
|---|---|---|---|
| 2,433,614 | 12/1947 | Longley | 252—207 |
| 1,628,190 | 5/1927 | Raney. | |
| 2,253,835 | 8/1941 | Welhan | 204—140 |
| 1,485,436 | 3/1924 | Slepian | 204—140 X |
| 1,937,489 | 11/1933 | Jenness | 23—234 |
| 1,915,473 | 6/1933 | Raney | 75—0.5 X |
| 2,461,396 | 2/1949 | Raney | 75—0.5 |

FOREIGN PATENTS

| | | |
|---|---|---|
| 623,360 | 7/1961 | Canada. |
| 907,907 | 10/1962 | Great Britain. |

DANIEL E. WYMAN, Primary Examiner

P. M. FRENCH, Assistant Examiner

U.S. Cl. X.R.

204—145, 141; 136—120